United States Patent [19]

Jameson

[11] B 3,913,411

[45] Oct. 21, 1975

[54] MULTISPEED POWER TRANSMISSION WITH PLURAL COUNTERSHAFTS

[75] Inventor: James J. Jameson, Coffeyville, Kans.

[73] Assignee: Gardner-Denver Company, Dallas, Tex.

[22] Filed: May 7, 1973

[21] Appl. No.: 358,244

[44] Published under the Trial Voluntary Protest Program on January 28, 1975 as document no. B 358,244.

[52] U.S. Cl. .................................. 74/360; 74/331
[51] Int. Cl. ............................................. F16H 3/08
[58] Field of Search ............ 74/360, 325, 331, 332, 74/356, 359

[56] References Cited
UNITED STATES PATENTS

| | | | |
|---|---|---|---|
| 2,511,039 | 6/1950 | Black et al. .................. | 74/359 X |
| 3,050,164 | 8/1962 | Bowen et al. .................. | 74/360 X |
| 3,064,488 | 11/1962 | Lee et al. ...................... | 74/331 X |
| 3,138,965 | 6/1964 | Brey et al. ..................... | 74/331 |
| 3,465,609 | 9/1969 | Fisher et al. ................... | 74/360 |
| 3,555,920 | 1/1971 | Merritt .......................... | 74/356 |
| R25,458 | 10/1963 | Barth et al. ................... | 74/360 X |

*Primary Examiner*—Samuel Scott
*Assistant Examiner*—Lance W. Chandler
*Attorney, Agent, or Firm*—Michael E. Martin

[57] ABSTRACT

A power transmission having an input shaft, a pair of countershafts interconnected for opposite rotation, and a plurality of clutches and gear sets for selective connection of the countershafts to an output shaft which may be coaxially aligned with one of the countershafts or the input shaft.

6 Claims, 5 Drawing Figures

MULTISPEED POWER TRANSMISSION WITH PLURAL COUNTERSHAFTS

BACKGROUND OF THE INVENTION

Multispeed reversible power transmissions of the type comprising plural fluid actuated friction clutches which are selectively engageable for providing a range of speeds to a rotative output shaft are generally known. An example of such types of transmission devices is disclosed in various embodiments in U.S. Pat. No. 3,465,609 to J. F. Fisher et al. It is desirable with power transmissions of the subject type to provide an arrangement of gears and clutches which is as compact as possible in order to minimize the bulk of the transmission proper. It is also desirable in power transmissions of the subject type to provide for a family of transmissions offering various numbers of output speeds but using as many common parts as possible. It is further desirable to provide power transmissions of the subject type in which the gearing is arranged in such a way that a minimum number of rotatable shafts is required to provide a given number of output speeds.

SUMMARY OF THE INVENTION

The present invention comprises a multispeed reversible power transmission of the constant mesh gear type comprising a pair of parallel countershafts having fluid actuated clutch devices mounted thereon, and an output shaft mounted coaxial with one of the countershafts to provide a compact arrangement of the transmission components.

The present invention also comprises a multispeed reversible power transmission having a pair of parallel countershafts with fluid actuated clutches mounted thereon which may be selectively engaged and disengaged under load to change the speed ratio between rotative input and output shafts, and which includes an arrangement of power transmission gears and clutches which requires fewer rotatable shafts than similar prior art transmissions.

The present invention further comprises an arrangement of components in a multispeed reversible power transmission device of the constant mesh gear type which includes a pair of parallel countershafts drivenly connected to an input shaft, which arrangement provides for at least two-speed and three-speed embodiments of a power transmission device having a minimum of components which are not common to both embodiments, and which arrangement provides for a three-speed embodiment which is compact and occupies substantially the same space as the two-speed embodiment.

DESCRIPTION OF THE PREFERRED EMBODIMENTS

Figure 1:
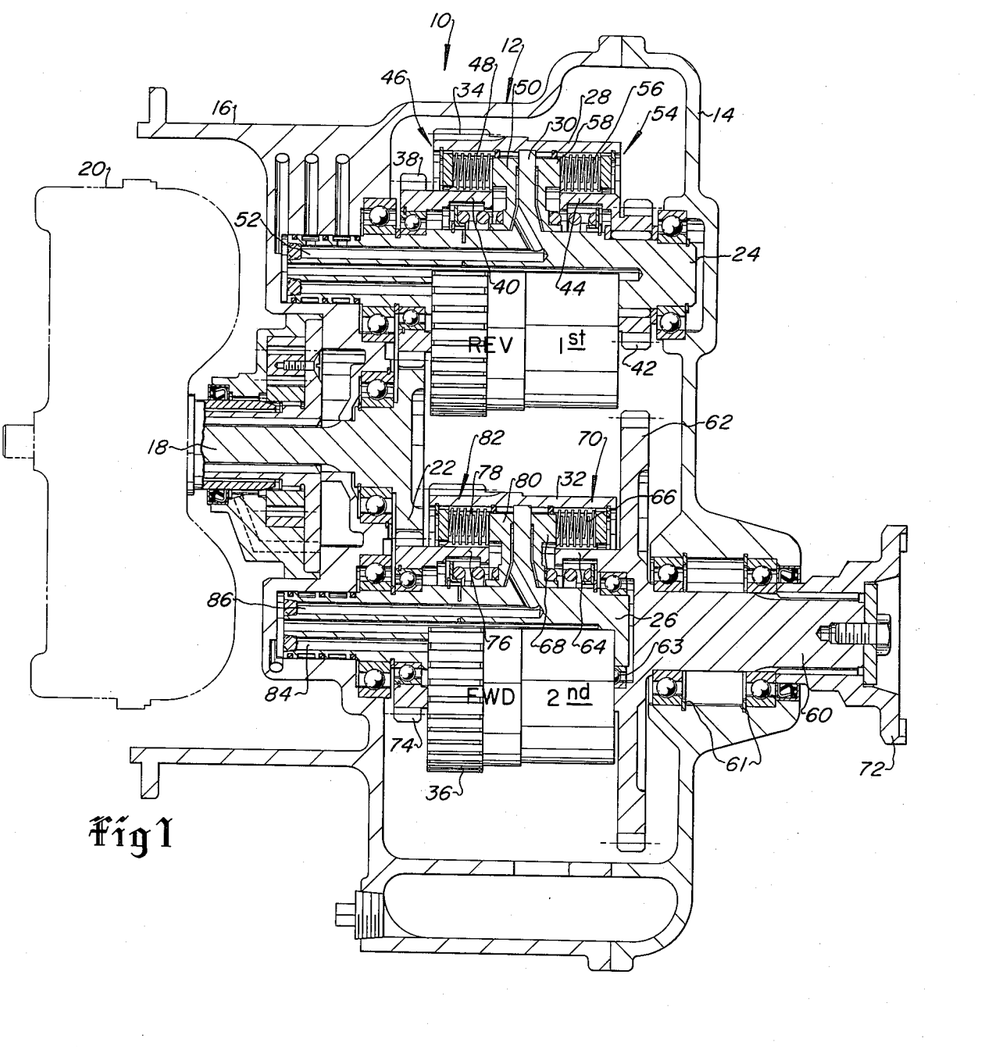
FIG. 1 is a longitudinal section view of a transmission in accordance with the present invention taken through the centers of the countershafts and the input shaft and revolved to be viewed in one plane.

Referring to FIG. 1 of the drawings a multispeed power transmission is shown and generally designated by numeral 10. The transmission 10 is generally known as a powershift transmission and is used in a variety of power transmission applications including changing the speed ratio between an engine or other prime mover and the drive wheels of a vehicle in both forward and reverse directions. The transmission 10 includes a housing 12 formed of separable members 14 and 16. An input shaft 18 is rotatably supported by the housing member 16 and is connected to a coupling 20 which may be a hydrodynamic torque converter or similar device, the casing of which may be suitably adapted for connection to a driving member of a prime mover, not shown. An input gear 22 is fixed on the shaft 18 and may be formed integral with the shaft. The transmission 10 also includes a pair of countershafts 24 and 26 rotatably supported in the housing 12. The countershaft 24 includes a double clutch drum 28 which may be formed integral with the shaft 24 or otherwise fixed to the shaft as by welding separate members to a flange portion 30. The shaft 26 also includes a double clutch drum member 32 similarly formed for rotation therewith. The clutch drums 28 and 32 respectively have gears 34 and 36 formed thereon, which gears are in constant mesh with each other but are shown separated in FIG. 1 because of the revolvement of the planes along which the section view of FIG. 1 is taken.

The countershaft 24 includes a gear 38 mounted for rotation with respect to the shaft 24 and in constant mesh with the input gear 22. The gear 38 is fixed to a clutch hub 40. A gear 42 is also mounted on countershaft 24 for rotation with respect thereto and the gear 42 is fixed to a clutch hub 44. A multiple plate fluid actuated friction clutch, generally designated by numeral 46, is formed by the drum 28, the hub 40, and a plurality of interleaved plates 48 which are arranged to form a driving connection between the hub 40 and drum 28 when pressed into frictionally driving engagement by a fluid actuated piston 50. Pressure fluid is supplied to the piston 50 through suitable passage means 52 in the countershaft 24 from a source, not shown. The basic construction and operation of clutch 46 is well known in the art of power transmission devices and, accordingly, further detailed description of this type of clutch, which is used throughout the various embodiments disclosed herein, is not needed for a clear understanding of the best mode of carrying out the instant invention. A clutch 54, similar to clutch 46 and formed by drum 28, the hub 44, a plurality of plates 56, and a piston 58 is also provided for drivingly connecting the countershaft 24 to gear 42.

The transmission 10 also includes an output shaft 60 rotatably mounted in the housing 12 and including a gear 62 fixed thereto which is in constant mesh with gear 42 and has a greater number of teeth than gear 42. The output shaft 60 is mounted in bearings 61 in the housing member 14 coaxial with the countershaft 26. The output shaft 60 includes a clutch hub 64 which together with a set of interleaved plates 66, the clutch drum 32, and a piston 68 forms a clutch 70 for drivingly connecting the countershaft 26 to the output shaft 60. The output shaft 60 may be provided with a suitable coupling member 72 for connecting the output shaft to a driven load, not shown. The output shaft 60 also includes bearing means 63 for partially supporting countershaft 26.

The transmission 10 further includes a gear 74 which is in constant mesh with the input gear 22 and is mounted on countershaft 26 for rotation with respect thereto. The gear 74 is fixed to a clutch hub 76 which together with a set of plates 78, a piston 80, and the drum 32 forms a clutch 82 for drivingly connecting the input shaft 18 to the countershaft 26 by way of gears 22 and 74 when the clutch 82 is engaged. Suitable passages 84 and 86 are provided in the countershaft 26 for conducting pressure fluid to the pistons 68 and 80 for engaging the respective clutches 70 and 82.

The transmission 10 may be operated to drivingly connect the input shaft 18 to the output shaft 60 by engagement of either clutch 46 or clutch 82 and one of the clutches 54 or 70. The engagement of clutch 82 may be arbitrarily chosen as providing for rotation of the output shaft in the forward direction. Hence, when clutches 82 and 54 are engaged the output shaft 60 is driven by way of gears 42 and 62 at a forward low speed with respect to the input shaft 18, and when clutches 82 and 70 are engaged the output shaft is driven at a relatively higher forward speed with respect to the input shaft. Since the clutch drums 38 and 32 are driven one by the other in opposite directions of rotation, when clutch 46 is engaged the engagement of either clutch 54 or 70 will provide for reverse rotation of the shaft 60 at, respectively, a relatively low or high speed with respect to the input shaft 18. Accordingly, the transmission 10 provides two output speeds in both forward and reverse direction of rotation.

Figure 2:
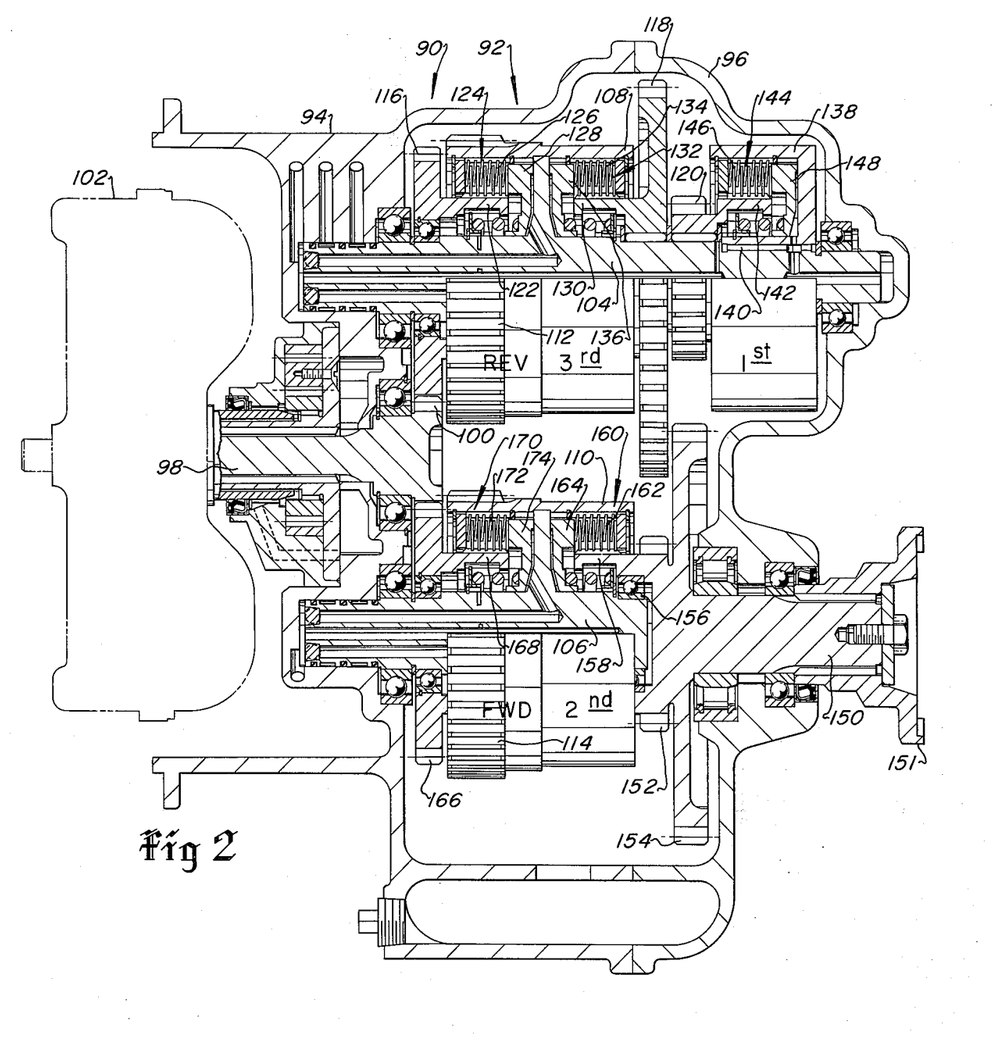
FIG. 2 is a longitudinal section view of another embodiment of the present invention shown in a way similar to FIG. 1.
Figure 3:
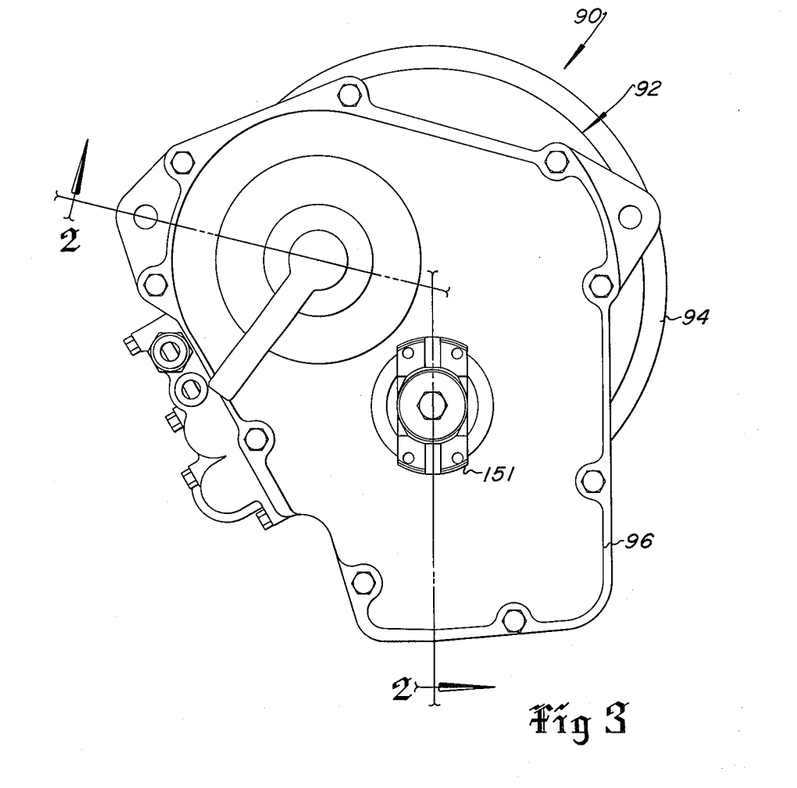
FIG. 3 is an elevation of the embodiment of FIG. 2 showing the location of the cutting planes for the view of FIG. 2.

Referring to FIGS. 2 and 3, an embodiment of the present invention is illustrated in the form of a multispeed power transmission 90 which is operable to provide three output speeds for one input speed in both forward and reverse directions of rotation of the output shaft. The transmission 90 is similar to the transmission 10 in that it includes a housing 92 comprising members 94 and 96, in which housing is rotatably supported an input shaft 98 having an input gear 100 fixed thereon. The input shaft may be drivenly connected to a suitable coupling device such as the torque converter 102 illustrated. The transmission 90 also includes parallel countershafts 104 and 106 rotatably supported in the housing 92 and provided with double clutch drums 108 and 110 fixed to the respective shafts. The clutch drums 108 and 110 are provided with intermeshing gear portions 112 and 114, shown separated because of the revolvement of the planes from which the view of FIG. 2 is taken.

The countershaft 104 includes a gear 116 mounted for rotation thereon and meshed with gear 100 on the input shaft. The countershaft 104 is extended somewhat when compared to the countershaft 24 and also includes gears 118 and 120 separately mounted on countershaft 104 for rotation with respect thereto. The gear 116 is fixed to a hub 122 which forms part of a clutch 124 including a set of plates 126, a piston 128 and the drum 108. The clutch 124 is of the same type as previously described herein for the transmission 10 and is operable to join gear 116 to countershaft 104 for rotation therewith. The gear 118 is similarly fixed to a hub 130 which forms a clutch 132 together with a set of interleaved plates 134, a piston 136 and the drum 108. When piston 136 is actuated to engage clutch 132 the gear 118 is drivenly connected to the countershaft 104.

The countershaft 104 is extended to include a clutch drum 138 which is suitably fixed to the countershaft by splines 140 for rotation therewith. The gear 120 is fixed to a hub 142 which is part of a clutch 144 also including a set of plates 146, a piston 148, and the drum 138. When clutch 144 is engaged the gear 120 is drivenly connected to the countershaft 104.

The transmission 90 also includes an output shaft 150 rotatably supported by the housing member 96 and adapted to include a coupling member 151 for connecting the output shaft to a driven load such as the driveshaft of a wheeled vehicle or the like. The output shaft 150 includes gears 152 and 154 fixed thereto, which gears are respectively meshed with gears 118 and 120 on the countershaft 104. The gear 154 has a greater number of teeth than gear 120 and gear 118 has a greater number of teeth than gear 152.

The output shaft 150 partially supports the countershaft 106 by means of a bearing assembly 156 and is coaxial with the countershaft. The output shaft further includes a hub 158 which forms part of a clutch 160, the clutch also including a set of plates 162, a piston 164 and the clutch drum 110. When clutch 160 is engaged countershaft 106 and output shaft 150 are connected for rotation together.

The countershaft 106 includes a gear 166 mounted for rotation thereon and meshed with the gear input 100 on the shaft 98. The gear 166 is fixed to a hub 168 forming a part of a clutch 170 which also comprises a set of plates 172, a piston 174, and clutch drum 110. When clutch 170 is engaged the countershaft 106 is drivenly connected to the input shaft 98 by way of gears 100 and 166. Accordingly, clutch 170 may be arbitrarily designated as the forward drive clutch and the clutch 124 as the reverse drive clutch similar to the arrangement of the transmission 10. When the clutches 170 and 144 are engaged the output shaft 150 is driven at a first or low speed with respect to the input shaft, when clutches 170 and 160 are engaged a second and higher output shaft speed is produced for a given input speed, and when clutch 170 is engaged along with clutch 132 a third and still higher output speed is produced at shaft 150 as may be readily understood from the foregoing explanation. For rotation in the opposite direction with the same first, second, and third output speeds clutch 124 is engaged respectively with clutch 144, 160 or 132. The same forward and reverse speed ratios are provided by gears 116 and 166 and gear portions 112 and 114 being of the same number of teeth. Different sets of speed ratios in forward and reverse may be provided by having different numbers of teeth on gears 116 and 166, for example. As may be appreciated from the foregoing description read in the company of the drawing FIGS. 2 and 3, the arrangement of the output shaft 150 to be coaxial with the countershaft 106 together with the clutch 144 disposed on the parallel countershaft 104 provides a compact arrangement for the transmission 90.

Figure 4:
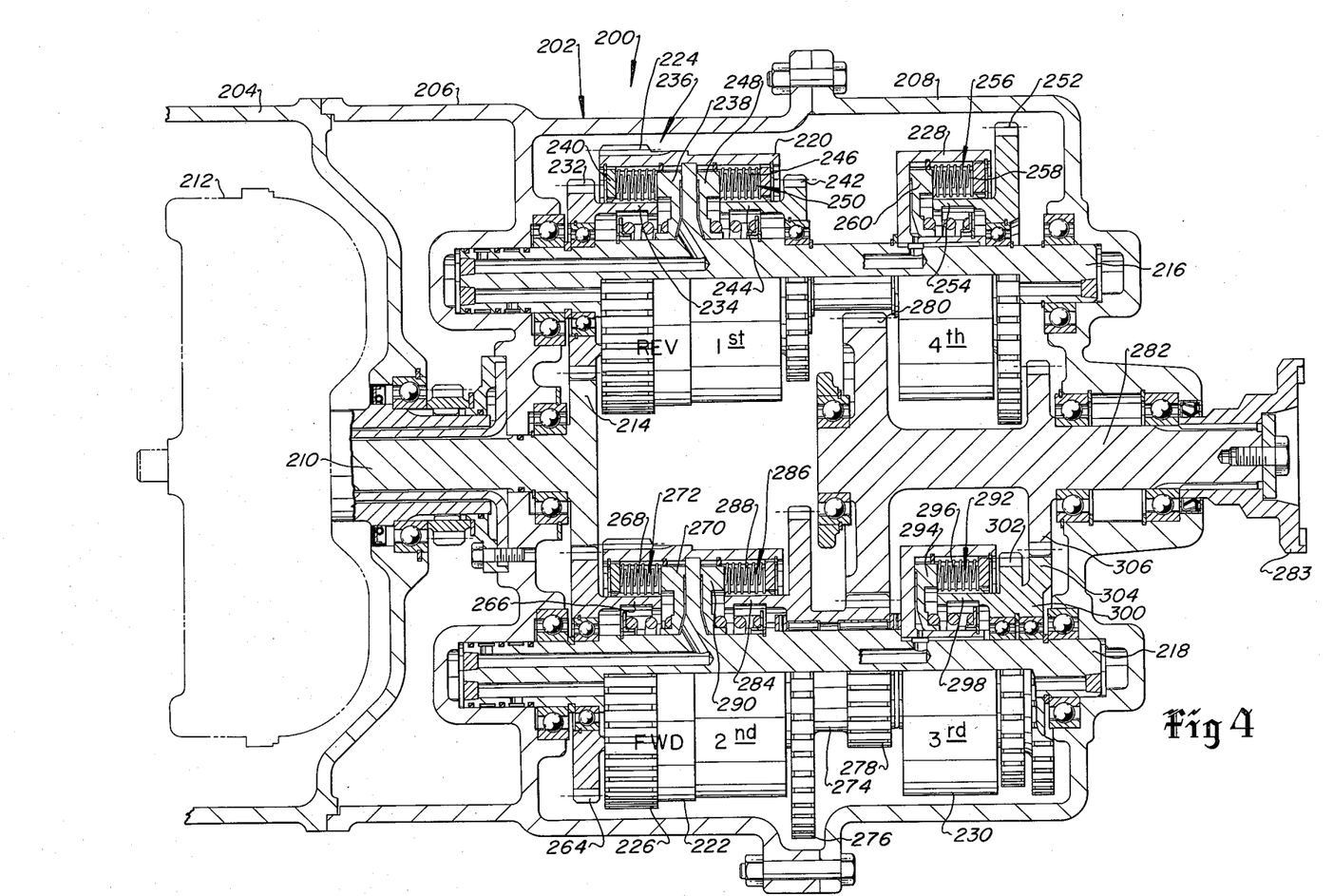
FIG. 4 is a longitudinal section view of a second alternate embodiment of the present invention taken along line 4—4 of FIG. 5; and, FIG. 5 is an elevation of the embodiment of FIG. 4 showing the location of the cutting planes for the view of FIG. 4.
Figure 5:
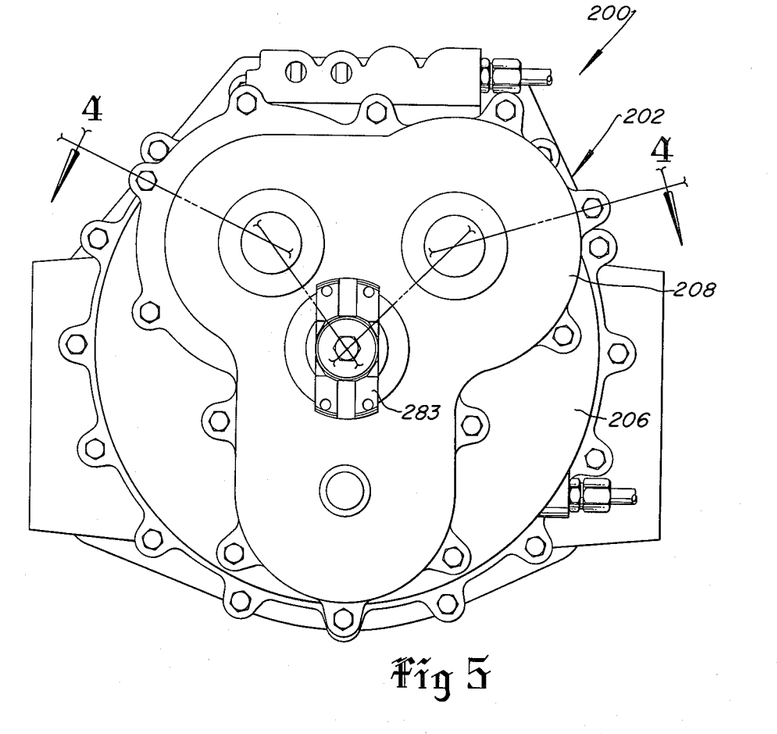

A second alternate embodiment of a multispeed reversible power transmission in accordance with the present invention is illustrated in FIGS. 4 and 5. The embodiment of FIGS. 4 and 5 comprises a transmission 200 having a housing 202 made up of separable members 204, 206, and 208. The transmission 200 includes a rotatably mounted input shaft 210 suitably connected to a coupling device such as the turbine of a torque converter 212. The input shaft 210 has an integral input gear 214 formed thereon. The transmission 200 also includes a pair of countershafts 216 and 218 mounted parallel to each other for rotation in the housing 202. The countershafts 216 and 218 respectively include double clutch drums 220 and 222 fixed to the countershafts and including gear portions 224 and 226 which are in constant mesh with each other. A clutch drum 228 is mounted on and fixed for rotation with countershaft 216 and a clutch drum 230 is similarly mounted on and fixed to rotate with countershaft 218.

A gear 232 is rotatably mounted on countershaft 216 and is in constant mesh with the input gear 214. The gear 232 includes a hub 234 which forms a clutch 236 together with a piston 238, a set of plates 240 and the clutch drum 220. The clutch 236 is virtually identical in form to the clutches previously disclosed herein and may be arbitrarily selected as the reverse direction clutch for drivingly connecting the input shaft 210 to the countershaft 216. The countershaft 216 also includes a gear 242 rotatably mounted thereon and having a hub portion 244 which together with a set of plates 246, a piston 248 and the drum 220 comprises a clutch 250 which, when engaged, drivingly connects countershaft 216 to gear 242. A third gear 252 is rotatably mounted on countershaft 216 and is fixed to a hub 254 of a clutch 256 also comprising a set of plates 258, a piston 260 and the drum 228. When clutch 256 is engaged the gear 252 is connected to countershaft 216 to be rotated therewith.

The countershaft 218 includes a gear 264 which is mounted for rotation thereon and is in constant mesh with the input gear 214. The gear 264 is fixed to a hub 266 which together with drum 222, a set of plates 268, and a piston 270 comprises a clutch 272 for drivingly connecting the input shaft 210 to the countershaft 218 when said clutch is engaged. The countershaft 218 further includes a member 274 rotatably mounted thereon and comprising gear portions 276 and 278. The gears 276 and 278 are fixed to the member 274 for rotation together. The gear 276 is somewhat larger in number of teeth as compared to gear 242 on countershaft 216 and is in constant mesh with gear 242. The gear 278 is in constant mesh with a gear 280 which is fixed to a rotatable output shaft 282 for the transmission 200. The output shaft 282 is suitably mounted for rotation in the housing member 208 and includes coupling means 283 mounted thereon for connecting the output shaft to a driven load. The output shaft 282 is also in coaxial alignment with the input shaft 210. This coaxial alignment of the output shaft with respect to the input shaft provides a compact arrangement of the components of the transmission 200 and is advantageous for many power train layouts in vehicles of various types.

The member 274 also includes a hub 284 forming part of a clutch 286, said clutch also including a set of plates 288, a piston 290, and the drum 222. The engagement of clutch 286 drivingly connects countershaft 218 to gears 276 and 278 for rotation together with the countershaft and accordingly also driving the output shaft 282.

A third clutch 292 on countershaft 218 is characterized by the clutch drum 230, a piston 294, a set of plates 296 and a hub 298. The hub 298 is fixed to a member 300 which is rotatably mounted on the countershaft 218 and includes gears 302 and 304 fixed thereto. The gear 302 is somewhat smaller in number of teeth as compared to the gear 252 on countershaft 216 and is in constant mesh with gear 252. The gear 304 is in constant mesh with a second gear 306 fixed to the output shaft 282.

The arrangement of the two parallel countershafts 216 and 218, each with three selectively engageable clutches mounted thereon, and the associated gearing as disclosed hereinabove provides a transmission which is capable of producing four output speeds for a given input speed in both forward and reverse directions of rotation of the output shaft 282. For example four forward speeds may be obtained by engaging clutch 272 together with one of clutches 250, 286, 292 or 256 to provide four progressively higher speeds of the output shaft 282. In like manner since the gears 224 and 226 provide for counterrotation of the countershafts 216 and 218, the engagement of clutch 236 together with one of the clutches 250, 286, 292, or 256 in the named order will produce four progressively higher speeds of output shaft 282 in the reverse direction of rotation.

As may be appreciated from the foregoing disclosure the transmissions 10, 90, and 200 provide for advantageous arrangements of clutches, gearing and shafts which are more compact and require fewer parts than prior art multispeed forward and reverse constant mesh gear transmissions particularly of the type employing plural fluid actuated clutches and mounting shafts therefor.

What is claimed is:

1. A multispeed constant mesh gear transmission comprising:
   a housing;
   an input shaft having an input gear mounted thereon;
   a first countershaft having a first gear rotatably mounted thereon and in constant mesh with said input gear, and a first clutch for connecting said first gear for rotation with said first countershaft;
   a second countershaft parallel to said first countershaft and having a second gear rotatably mounted thereon and in constant mesh with said input gear, and a second clutch for connecting said second gear for rotation with said second countershaft;
   third and fourth gears fixed respectively to said first and second countershafts and meshed one with the other;
   a fifth gear rotatably mounted on said first countershaft and a third clutch for connecting said fifth gear to rotate with said first countershaft;
   an output shaft including means for connecting said output shaft to a driven load, said output shaft being rotatably mounted in coaxial alignment with said second countershaft, said output shaft including first and second gear means fixed thereon, said first gear being meshed with said fifth gear to be rotatably driven thereby;
   a fourth clutch for connecting said second countershaft to said output shaft; and,
   a sixth gear mounted for rotation on said first countershaft and meshed with said second gear means, and a fifth clutch for connecting said sixth gear to said first countershaft for rotation with said first countershaft to thereby drive said output shaft when said first or second clutches are engaged.

2. The invention set forth in claim 1 wherein:
said output shaft is rotatably supported in said housing and includes bearing means for at least partially supporting said second countershaft for rotation with respect to said output shaft.

3. A multispeed constant mesh gear transmission comprising:
a housing;
an input shaft having an input gear mounted thereon;
a first countershaft having a first gear rotatably mounted thereon and in constant mesh with said input gear, and a first clutch for connecting said first gear for rotation with said first countershaft;
a second countershaft parallel to said first countershaft and having a second gear rotatably mounted thereon and in constant mesh with said input gear, and a second clutch for connecting said second gear for rotation with said second countershaft;
third and fourth gears fixed respectively to said first and second countershafts and meshed one with the other;
a fifth gear rotatably mounted on said second countershaft and a third clutch for connecting said fifth gear to rotate with said second countershaft;
a sixth gear mounted for rotation on said first countershaft and meshed with a seventh gear fixed to said fifth gear;
a fourth clutch for connecting said sixth gear to said first countershaft;
an eighth gear mounted for rotation on said second countershaft;
a fifth clutch for connecting said eighth gear to said second countershaft; and,
an output shaft including means for connecting said output shaft to a driven load, said output shaft being rotatably mounted in coaxial alignment with at least one of said previously mentioned shafts, said output shaft including first gear means fixed thereon and meshed with said fifth gear to be rotatably driven thereby, and second gear means fixed on said output shaft and meshed with said eighth gear.

4. The invention set forth in claim 3 together with:
a ninth gear mounted for rotation on said first countershaft and meshed with a tenth gear fixed to said eighth gear for rotation therewith, and a sixth clutch for connecting said ninth gear to said first countershaft.

5. The invention set forth in claim 4 wherein:
said output shaft is coaxial with said input shaft.

6. A multispeed constant mesh gear transmission comprising:
a housing;
an input shaft having an input gear mounted thereon;
a first countershaft having a first gear rotatably mounted thereon and in constant mesh with said input gear, and a first clutch for connecting said first gear for rotation with said first countershaft;
a second countershaft parallel to said first countershaft and having a second gear rotatably mounted thereon and in constant mesh with said input gear, and a second clutch for connecting said second gear for rotation with said second countershaft;
third and fourth gears fixed respectively to said first and second countershafts and meshed one with the other;
a fifth gear mounted for rotation on said second countershaft and a third clutch for connecting said fifth gear to said second countershaft;
a sixth gear mounted for rotation on said first countershaft and a fourth clutch for connecting said sixth gear to said first countershaft, said sixth gear being in mesh with a seventh gear fixed for rotation with said fifth gear;
an eighth gear mounted for rotation on said second countershaft and a fifth clutch for connecting said eighth gear to said second countershaft;
a ninth gear mounted for rotation on said first countershaft and a sixth clutch for connecting said ninth gear to said first countershaft, said ninth gear being in mesh with a tenth gear fixed for rotation with said eighth gear; and,
an output shaft including first gear means fixed thereon and in mesh with said fifth gear and second gear means fixed on said output shaft and meshed with said eighth gear.

* * * * *

UNITED STATES PATENT OFFICE
CERTIFICATE OF CORRECTION

Patent No. 3,913,411　　　　　　　　　　Dated　October 21, 1975

Inventor(s)　James J. Jameson

It is certified that error appears in the above-identified patent and that said Letters Patent are hereby corrected as shown below:

Column 3, line 29, "38" should read -- 28 --.

Column 4, line 32, delete "input"; same line 32, before "gear" insert -- input --.

Column 6, line 58, after "gear", first occurrence, insert -- means --.

Signed and Sealed this twenty-fifth Day of May 1976

[SEAL]

Attest:

RUTH C. MASON
*Attesting Officer*

C. MARSHALL DANN
*Commissioner of Patents and Trademarks*